(12) United States Patent
Aldrey et al.

(10) Patent No.: US 8,776,117 B2
(45) Date of Patent: Jul. 8, 2014

(54) METHOD AND APPARATUS FOR PROVIDING EXPANDED DISPLAYABLE APPLICATIONS

(75) Inventors: Raul Aldrey, Dallas, TX (US); Brian F. Roberts, Frisco, TX (US); Heath Stallings, Colleyville, TX (US); Shafiq Kassam, Lewisville, TX (US); Enrique Ruiz Velasco Fonseca, Flower Mound, TX (US); Prabhakar Mani, Lewisville, TX (US); Laxmi Patel, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 272 days.

(21) Appl. No.: 11/966,681

(22) Filed: Dec. 28, 2007

(65) Prior Publication Data

US 2009/0172746 A1    Jul. 2, 2009

(51) Int. Cl.
*H04N 7/10*       (2006.01)
*H04N 7/025*      (2006.01)
*G06F 3/00*       (2006.01)
*G06F 13/00*      (2006.01)
*H04N 5/445*      (2011.01)

(52) U.S. Cl.
USPC ............................................. 725/37; 725/32

(58) Field of Classification Search
USPC ............................................. 725/32, 34, 37
See application file for complete search history.

(56) References Cited

U.S. PATENT DOCUMENTS

| | | | |
|---|---|---|---|
| 2002/0178447 A1* | 11/2002 | Plotnick et al. | 725/36 |
| 2005/0015803 A1* | 1/2005 | Macrae et al. | 725/41 |
| 2007/0061724 A1* | 3/2007 | Slothouber et al. | 715/716 |
| 2007/0083908 A1* | 4/2007 | McCarthy et al. | 725/112 |
| 2008/0229353 A1* | 9/2008 | Morris et al. | 725/32 |
| 2008/0263600 A1* | 10/2008 | Olague et al. | 725/58 |
| 2008/0294998 A1* | 11/2008 | Pyhalammi et al. | 715/748 |
| 2009/0111448 A1* | 4/2009 | Paila | 455/418 |
| 2011/0131597 A1* | 6/2011 | Cera et al. | 725/24 |

* cited by examiner

*Primary Examiner* — John Schnurr

(57) ABSTRACT

An approach is provided for presenting, via a set-top box, a widget. The widget includes content retrieved over a data network and augmented content.

30 Claims, 9 Drawing Sheets

METHOD AND APPARATUS FOR PROVIDING EXPANDED DISPLAYABLE APPLICATIONS

BACKGROUND INFORMATION

With the advent of computers, interactive electronic communications, and the Internet, as well as advances in the digital realm of consumer information, has come a reinvention of conventional entertainment and communication services to enhance programming, recording, and viewing of multimedia, such as broadcast television programs. Traditionally, broadcast media, being based on pre-computer age technology, has developed on its own path, without any regard to other media systems. However, with readily available, cost-effective broadband services, bandwidth intensive applications, such as video streaming, have become viable alternatives to legacy broadcast systems.

For example, internet protocol television (IPTV) service providers are currently offering subscribers various video services ranging from multi-channel video programming that mimics traditional broadcast television, to true video-on-demand (VOD) programming. These services are further supplemented with interactive video applications that enable robust programming information, selection. and navigation functionality, as well as integrated digital video recording, and data services to enhance the video experience. However, in adopting these advancements, the media industry faces a number of challenges hindering the convergence of broadband rich data content (e.g., traditional IP-based content) with live television productions and targeted advertisements.

Therefore, there is a need for an approach that seamlessly integrates expanded access to broadband digital content, live television productions, and targeted advertisements.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for presenting displayable applications including content retrieved over a data network and augmented content are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a set-top box (STB), it is contemplated that these embodiments have applicability to any device capable of processing video signals for presentation to a user, such as a home communication terminal (HCT), a digital home communication terminal (DHCT), a stand-alone personal video recorder (PVR), a television set, a digital video disc (DVD) player, a video-enabled phone, a video-enabled personal digital assistant (PDA), and/or a personal computer (PC), as well as other like technologies and customer premises equipment (CPE).

Figure 1:
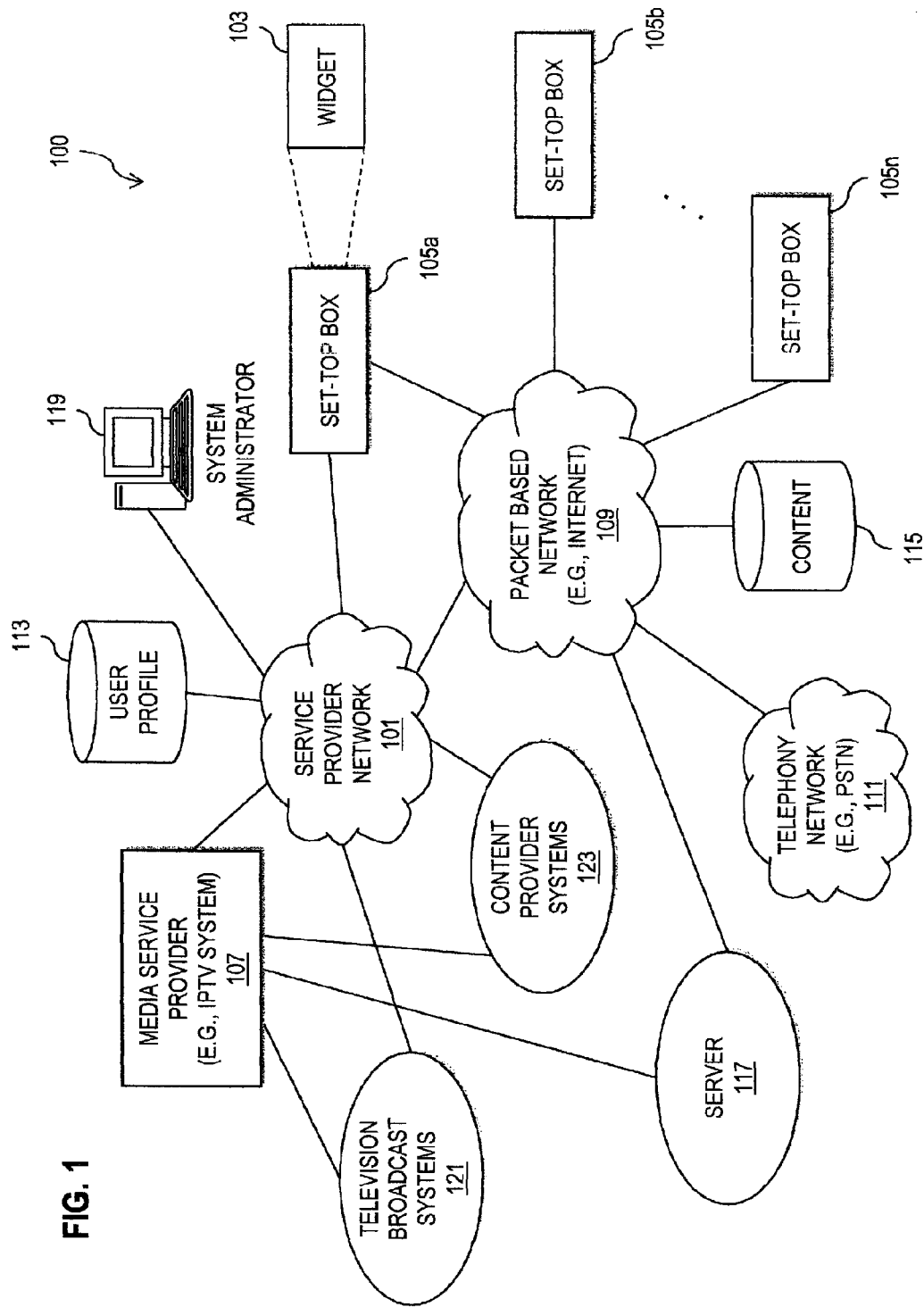
FIG. 1 is a diagram of a system capable of providing expanded widgets including content retrieved over a data network and augmented content, according to an exemplary embodiment.

FIG. 1 is a diagram of a system capable of providing expanded widgets including content retrieved over a data network and augmented content, according to an exemplary embodiment. A system 100 can be configured to display applications (e.g., widgets) that present content retrieved over a data network (e.g., sports coverage, weather forecasts, traffic reports, horoscopes, daily news, commentary, community service information, etc.) and augmented content (e.g., advertisements, broadcasts, video-on-demand (VOD), links, marketplace information, etc.) to a user of an STB. In this manner, a subscriber of the displayable application service may seamlessly obtain traditional IP-based data combined with supplemental media rich information. It is contemplated that system 100 may embody many forms and include multiple and/or alternative components and facilities.

It is observed that digital media formats are increasing in popularity among individuals seeking the most up-to-date information regarding sports coverage, weather forecasts, traffic reports, horoscopes, daily news, commentary, community service information, and the like. Further, society desires quick, mercurial access to supplemental forms of related and relevant information. To satisfy these thirsts, people are increasingly turning to specialized television programs and/or the Internet. The approach, according to certain embodiments, stems from the recognition that information seekers may benefit from an enhanced body of information, while appreciating the necessity to alleviate the associated burdens, expenses, and inefficiencies of having to supply and rummage through dedicated and disparate content sources.

Currently, little attention has been afforded to extending and enhancing the distribution of information within and among the entertainment arena and other commutations media. Thus, it is apparent that improvements are needed.

As seen in FIG. 1, it is noted that television remains the prevalent global medium for entertainment and information as individuals spend a great deal of time tuning into televised media. Accordingly, the service provider network 101 of system 100 integrates this medium with that of the telecommunications, computing, and media environments, thereby broadening the scope of devices and sources available to individuals for receiving concurrent and/or related sources of information. In this manner, system 100 relieves network operators from the burden and expense of providing dedicated and disparate content sources, by enabling users via user equipment, to automatically locate and receive content, such as sports coverage, weather forecasts, traffic reports, horoscopes, daily news, commentary, or community service information, in displayable overlay applications (e.g., widget 103) selectively including augmented content (e.g., advertisements, broadcasts, VOD, links, marketplace information, etc.). Although the user equipment is described with respect to an STB, it is contemplated that various embodiments have applicability to any device capable of processing video streams.

In a typical scenario, an individual (e.g., a subscriber of the displayable application service) may tune into a televised media program using an STB 105*a*, while retaining the ability to stay informed with sports, weather, traffic, horoscope, daily news, commentary, and community service information specific to their environment via an informational widget 103. Moreover, the displayable application service can enable subscribers to receive augmented information to supplement or further satisfy their curiosity. In other examples, service provider network 101 may enable subscribers to interact and share content with one another through personalized communications channels utilizing, for instance, a communicational widget 103, e.g., a displayable application enabling short messaging capabilities or voice application capabilities. In other instances, widget 103 can convey proprietary information to the service provider, such as an available content line up or service subscription options.

In the depicted embodiment, a plurality of STBs 105*a*-105*n* are configured to communicate with and receive signals and/or data streams, e.g., media content including at least one overlay instance, from a media service provider (MSP) 107 or other transmission facility. An overlay instance includes content retrieved over a data network (e.g., service provider network 101, packet-based network 109, and/or telephony network 111) and/or augmented content. STBs 105*a*-105*n* can be located at one or more subscriber sites that are geographically associated with one or more geospatial regions.

Exemplary MSPs 107 may comprise one or more media content servers (not illustrated) and/or data repositories (not shown). Alternatively, the servers and/or repositories may be accessed via one or more service provider networks 101 or packet-based networks 109, such as user profile repository 113, content repository 115, or server 117. Further, a service provider network 101 may include a system administrator 119 for operational and management functions to deploy the displayable application services using, for instance, an internet protocol television (IPTV) system. In this manner, STBs 105*a*-105*n* may utilize any appropriate technology to draw, receive, or transmit media content (including overlay instances) from/to an MSP 107 or other content source/sink. A more detailed explanation of an exemplary STB will be provided with respect to FIG. 2.

Media content generally includes audio-visual content (e.g., broadcast television programs, VOD programs, pay-per-view programs, IPTV feeds, DVD related content, etc.), pre-recorded media content, data communication services content (e.g., commercials, advertisements, videos, movies, songs, images, sounds, etc.), Internet services content and/or other equivalent media forms. In this manner, an MSP 107 may provide (in addition to their own media content) content obtained from sources, such as one or more television broadcast systems 121, one or more third-party content provider systems 123, content residing in a repository 115 or server 117 accessible over a packet-based network 109, or available via one or more telephony networks 111, etc.

Exemplary embodiments enable MSPs 107 to transmit and/or interlace content retrieved over, for instance, the packet-based network 109 and augmented content with conventional media content streams. In alternative embodiments, STBs 105*a*-105*n* may be concurrently configured to draw/receive/transmit content from (or to) multiple sources, thereby alleviating the burden on any single source, e.g., MSP 107, to gather, supply, or otherwise meet the content demands of any user or site. Thus, particular embodiments enable authenticated third-party television broadcast systems 121, content provider systems 123, or servers 117 to transmit media content and/or overlay instances to STBs 105*a*-105*n* either apart from, or in conjunction with, MSP 107.

Overlay content may include, but is certainly not limited to, information regarding weather, traffic, news, sports, current events, breaking stories, commentary, headlines, advertisements, horoscopes, solicitations, financial advice, stocks, markets, events, schools, governments, blog entries, podcasts, and the like. Moreover, overlay content may be provided by any authenticated source, including grassroots groups or individuals, non-profits, governmental organizations, public/private institutions, etc. Further, overlay content may be specific to certain geographic locations or selectively distributed based on user demographics (e.g., ethnicity, gender, age, occupation, etc.), geography (e.g., zip code), interests, affiliations, and the like. Additionally, overlay content may be generated based on information corresponding to STB users, i.e., overlay content may be tailored to specific individuals or focus groups. In other instances, overlay content may include information proprietary to the service provider, such as a content line up, service subscription options, data about subscribers, and the like. It is noted that overlay content can be any type of information provided from any source having connectivity to system 100.

Augmented content may include supplemental information to the aforementioned forms of overlay content. In particular embodiments, the augmented content may include targeted advertisements, video channels, marketplace information, VOD programs, and the like, as well as links to the same. In still more specific embodiments, the augmented content may include information targeted to a subscriber based on user profiles, overlay content, augmented content, or a configuration of the subscriber's STB.

Moreover, the overlay content and augmented content may be distinguished (or otherwise categorized) utilizing metadata included therewith or appended thereto. Metadata can be generally considered data about data; but more specifically, it can be utilized to describe all aspects of, and content distributed by, system 100. Namely, metadata can include descriptions about: data aspects (file name, type, administrator, size, location, version, or include timestamps, mode bits, arbitrary attribute-value pairs, etc.), titles, activities/events, individuals and organizations involved, intended audiences (e.g., ethnicities, ages, genders, incomes, educational levels, disabilities, mobilities, as well as other like demographic statistics), geospatial identifications (intended zip codes, school districts, communities, etc.), locations of supplementary information and processes, access methods, limitations, timing of activities/events (e.g., start/end dates), as well as motivations, policies and rules. As such, metadata may be utilized by various components of system 100 for control or guiding purposes.

In particular embodiments, system 100 may structure and encode metadata to describe characteristics of the content-bearing entities to aid in the creation, identification, discovery, assessment, and management of the overlay and/or augmented content. Alternative embodiments may utilize metadata to optimize compression algorithms or perform other computational tasks by the components of system 100. The metadata might be utilized to specify overlay or augmented content that is to be presented to a plurality of STBs. Various other embodiments might use metadata to correlate overlay content or augmented content with user profiles to determine the overlay and/or augmented content that is to be presented to a user. A more detailed explanation of user profiles is provided with respect to FIG. 2.

Accordingly, STBs 105a-105n may communicate with MSPs 107, television broadcast systems 121, third-party content provider systems 123, or servers 117 via one or more service provider networks 101. These networks 401 may employ various access technologies (including broadband methodologies) including, but certainly not limited to, cable networks, satellite networks, subscriber television networks, digital subscriber line (DSL) networks, optical fiber networks, hybrid fiber-coax networks, worldwide interoperability for microwave access (WiMAX) networks, wireless fidelity (WiFi) networks, other wireless networks (e.g., 3G wireless broadband networks, mobile television networks, radio networks), terrestrial broadcasting networks, provider specific networks (e.g., a Verizon FiOS network, a TiVo network, etc), and the like.

Further, content may be transmitted from (or to) one or more packet-based networks 109 and/or telephony networks 111, such as the Internet, various intranets, local area networks (LAN), wide area networks (WAN), the public switched telephony network (PSTN), integrated services digital networks (ISDN), other private packet switched networks or telephony networks, as well as any additional equivalent system or combination thereof. These networks may utilize any suitable protocol supportive of data communications, e.g., transmission control protocols (TCP), internet protocols (IP), file transfer protocols (FTP), telnet, hypertext transfer protocols (HTTP), asynchronous transfer mode (ATM), socket connections, Ethernet, frame relay, and the like, to connect STBs 105a-105n to the various content sources. In alternative embodiments, STBs 105a-105n may be directly connected to the one or more various content sources, including MSP 107.

In various embodiments, the service provider network 101 may include one or more video processing modules (not shown) for acquiring and transmitting video feeds from MSP 107, the television broadcast systems 121, other third-party content provider systems 123, or servers 117 over one or more of the networks 101, 109, 111 to particular STBs 105a-105n. Accordingly, service provider network 101 may include facilities to support compression/decompression, coding/decoding, modulation/demodulation, optical/electrical conversion, and analog/digital conversion, as well as any other suitable signal processing and/or transmission operation. Further, service provider network 101 can optionally support end-to-end data encryption in conjunction with video streaming services such that only authorized users are able to view content and interact with other legitimate users/sources.

Accordingly, system 100 may include an authentication module (not shown) configured to perform authorization/authentication services and determine whether users or content sources are indeed subscribers to, or providers of, the displayable application service. An authentication schema may require a user name and password, a key access number, a unique machine identifier (e.g., media access control (MAC) address), etc., as well as any combination thereof. Thus, once an STB or content source is authenticated, connections between the STBs 105a-105n and the content sources may be established directly. Further, the authentication module may grant users the right to receive overlay and/or augmented content concerning one or more geographic regions serviced by system 100 by revoking existing sets of digital certificates associated with a particular region, and issuing new sets of digital certificates mapped to a second region. In this regard, an STB may receive new overlay and/or augmented content concerning the second region, whereas the previous session can be automatically closed when the "old" or prior certificates associated with the first region are revoked. This enables users to initiate secure sessions at any given STB 105a-105n linked to system 100, whether or not the STB belongs to that individual user. It is additionally contemplated that multiple rights sessions may exist concurrently.

In particular embodiments, MSP 107 may comprise an IPTV system configured to support the transmission of television video programs from the broadcast systems 121 as well as other content, such as overlay instances from the various third-party sources (e.g., 117, 121, 123) utilizing Internet Protocol (IP). That is, the IPTV system 107 may deliver video streams, including overlay and augmented data, in form of IP packets. Further, the transmission network (e.g., service provider network 101) may optionally support end-to-end data encryption in conjunction with the video streaming services, as mentioned earlier.

In this manner, the use of IP permits television services to be integrated with broadband Internet services, and thus, share common connections to a user site. Also, IP packets can be more readily manipulated, and therefore, provide users with greater flexibility in terms of control and offers superior methods for increasing the availability of content including overlay and augmented content. Delivery of video content, by way of example, may be through a multicast from the IPTV system 107 to the STBs 105a-105n. Any individual STB may tune to a particular source, e.g., channel, by simply joining a multicast of the video content, utilizing an IP group membership protocol (IGMP). For instance, the IGMP v2 protocol may be employed for joining STBs to new multicast groups. Such a manner of video delivery avoids the need for expensive tuners to view television broadcasts; however, other video delivery methods, such as directly modulated carriers (e.g., national television systems committee (NTSC), advanced television systems committee (ATSC), quadrature amplitude modulation (QAM)), may still be used. It should be noted that conventional delivery methods may still be implemented and combined with the advanced methods of system 100. Also, the video content may be provided to various IP-enabled devices, such as PCs, PDAs, web-appliances, mobile phones, etc.

Accordingly, an STB (e.g., STB 105a) may integrate all the functions of an IPTV system, as well as combine the overlay and augmented content functions of the various online or off-line environments, in a manner that seamlessly toggles among the functions. It is contemplated that the displayable application service may be extended to users with a presence on the Internet or retrieve content stored at a database 115 connected the packet-based network 109. In alternative embodiments, the services of system 100 could be extended to still further users having an end terminal (not shown), such as a plain old telephone service (POTS) device, connected to the telephony network 111. While system 100 is illustrated in FIG. 1, the exemplary components are not intended to be limiting, and indeed, additional or alternative components and/or implementations may be utilized.

Figure 2:
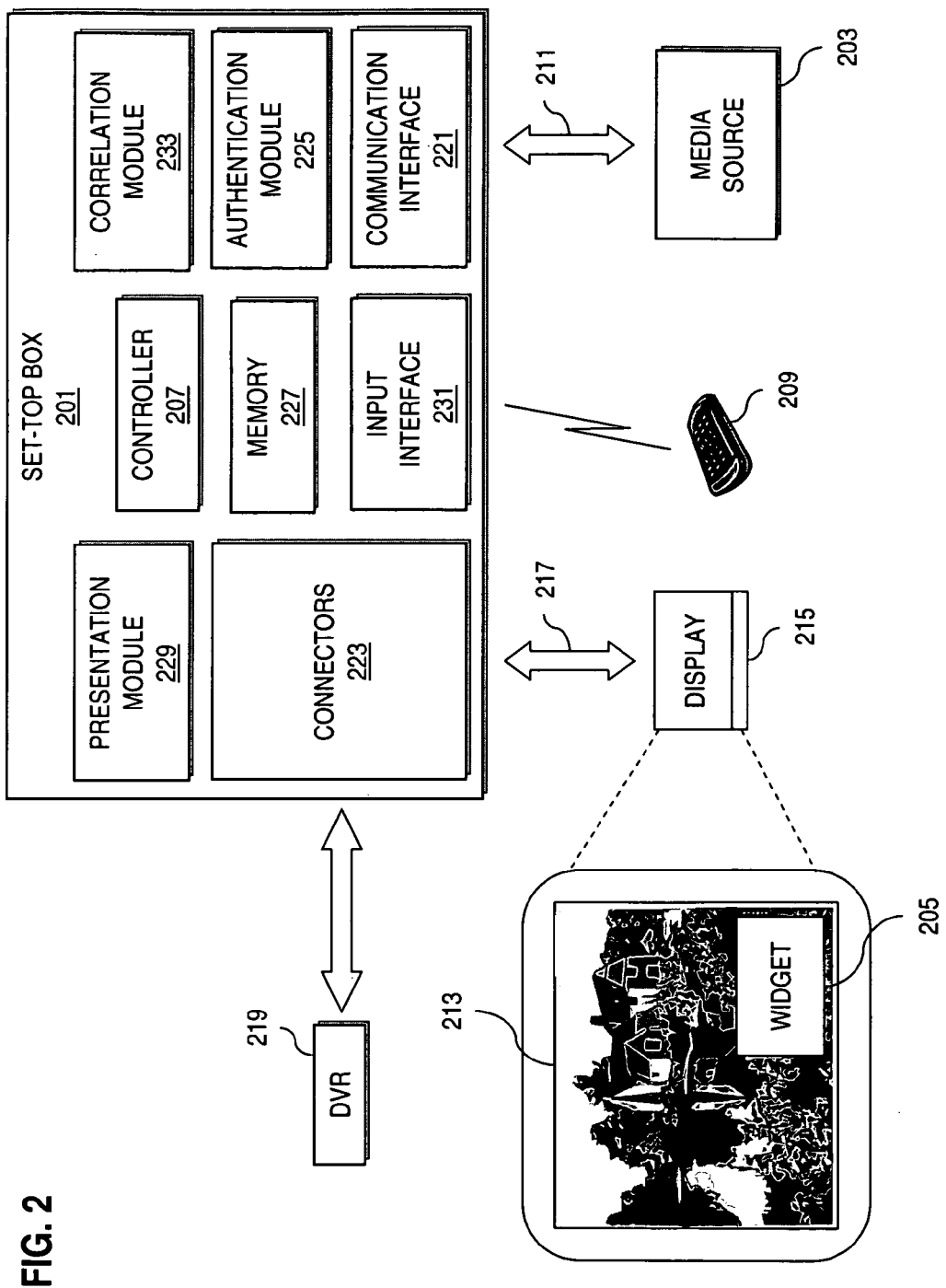
FIG. 2 is a diagram of a set-top box configured to provide expanded widgets, according to an exemplary embodiment.

FIG. 2 is a diagram of a set-top box configured to provide expanded widgets, according to an exemplary embodiment. STB 201 may comprise any suitable technology to receive one or more content streams, including at least one overlay instance, from a media source 203, such as the IPTV system of FIG. 1. The overlay instance includes content retrieved over a data network and/or augmented content for presentation via widget 205.

Accordingly STB 201 may comprise computing hardware (such as described with respect to FIG. 9) and include additional components configured to provide specialized services related to the reception and display of media content and overlay instances (e.g., remote control capabilities, conditional access functions, tuning functions, presentation functions, multiple network interfaces, audio/video signal ports, etc.). Alternatively, the functions and operations of STB 201 may be governed by a controller 207 that interacts with each of the STB components to provide overlay and/or augmented content that is generated based on predetermined criteria. In turn, a user may be afforded greater functionality utilizing a control device 209 to control these services, as will be more fully described below.

As such, STB 201 may be configured to process a content stream 211, including causing a displayable application (e.g., widget 205) and/or one or more components of the media content (e.g., video component 213 and/or an audio component) to be presented on (or at) display 215. Presentation of the media content and widget 205 may include: displaying, recording, playing, rewinding, forwarding, toggling, selecting, zooming, or any other processing technique that enables users to experience content streams 211. For instance, STB 201 may provide one or more signals 217 to a display 215 (e.g., television) so that the display 215 may present (e.g., display) the overlay instance (e.g., widget 205) on the media content (e.g., video 213) to a user, wherein the overlay instance includes content retrieved over a data network and augmented content.

STB 201 may also interact with a PVR, such as digital video recorder (DVR) 219, to store received signals that can then be manipulated by a user at a later point in time. In various embodiments, DVR 219 may be network-based, e.g., included as a part of the service provider network 101, collocated at a subscriber site having connectivity to STB 201, and/or integrated into STB 201. A display 215 may present content provided via STB 201 to a user. In alternative embodiments, STB 201 may be configured to communicate with a number of additional peripheral devices (not illustrated), including: PCs, laptops, PDAs, cellular phones, monitors, mobile devices, handheld devices, as well as any other equivalent technology capable of presenting content to a user. These peripherals may be configured to access content (including overlay and augmented content) stored and/or processed by STB 201. For example, a media content stream 211 may be received by STB 201 and recorded by DVR 219, wherein a PC may later access and view the stored content. Moreover, the peripheral devices may be configured to program or otherwise control the functions of STB 201.

Furthermore, STB 201 may include a communication interface 221 configured to receive content streams from an MSP 107 or other content source. Communication interface 221 may optionally include single or multiple port interfaces. For example, STB 201 may establish a broadband connection to multiple sources transmitting content to STB 201 via a single port, whereas in alternative embodiments, multiple ports may be assigned to the one or more sources. In still other embodiments, communication interface 221 may be configured to permit users, via STB 201, to transmit data (including media content and overlay instances) to other users with STBs, an MSP 107, or other content source/sink.

According to various embodiments, STB 201 also includes inputs/outputs (e.g., connectors 223) to display 215 and DVR 219, as well as an audio system (not illustrated). The audio system may comprise a conventional audio-video receiver capable of monaural or stereo sound, as well as multichannel surround sound. Further, the audio system may include speakers, ear buds, headphones, or any other suitable component configured for personal or public dissemination. As such, STB 201, display 215, DVR 219, and the audio system for example, may support high resolution video streams, such as high definition television (HDTV) or digital theater systems high definition (DTS-HD) audio. Therefore, STB 201 may be configured to encapsulate data into a proper format with required credentials before transmitting onto one or more of the networks of FIG. 1 and de-encapsulate incoming traffic to dispatch data to display 215 and/or the audio system.

In an exemplary embodiment, display 215 and/or the audio system may be configured with Internet Protocol (IP) capability (i.e., includes an IP stack, or is otherwise network addressable), such that the functions of STB 201 may be assumed by display 215 and/or the audio system. In this manner, an IP ready. HDTV display or DTS-HD audio system may be directly connected to one or more service provider networks 101, packet-based networks 109, and/or telephony networks 111. Although STB 201, display 215, and DVR 219 are shown separately, it is contemplated that these components, as well as the audio system, may be integrated into a single component, or other combination of components.

An authentication module 225 may be provided at STB 201 to initiate or respond to authentication schemes of, for instance, service provider network 101 or various other content providers, e.g., broadcast television systems 121, third-party content provider systems 123, or servers 117. Authentication module 225 may provide sufficient authentication information, e.g., a user name and password, a key access number, a unique machine identifier (e.g., MAC address), and the like, as well as combinations thereof, to a corresponding network interface for establishing connectivity. As described earlier, one or more digital certificates may be simultaneously mapped. Further, authentication information may be stored locally at memory 227, in a repository (not illustrated) connected to STB 201, or at a remote repository, e.g., user profile repository 113.

Authentication module 225 may also facilitate the reception of media content, as well as overlay and augmented content, from single or disparate sources. For instance, STB 201 may receive a video stream from a first source (e.g., IPTV system 107), overlay content from a second source (e.g., content provider system 123), and augmented content from a third source (e.g., server 117). As such, display 215 will present the video stream, overlay content, and augmented content to the user, wherein a displayable application (e.g., widget 205) can permit users to experience the overlay and augmented content from a variety of sources. This presentation may be experienced separately, concurrently, in a toggled fashion, or with zooming, maximizing, and minimizing capabilities, or in any other like mode. In other exemplary embodiments, authentication module 225 can authenticate a user to allow them to specify metadata for content of the widget 205 that is to be presented to multiple STBs.

A presentation module 229 may be configured to receive data streams (e.g., video feed(s), overlay content, and/or augmented content) and output a result via one or more connectors 223 to display 215 and/or the audio system. It is noted that aural aspects of widget 205 may be presented via the audio system and/or display 215. In this manner, a displayable application (in the form of widget 205) may be provided by presentation module 229 that is overlaid on video content output to the display 215. The presented overlay and augmented content may be generated and/or distributed based on information corresponding to the STB user. Additionally, the augmented content may also be generated and/or distributed based on overlay content.

Connector(s) 223 may provide various physical interfaces to display 215 and the audio system, as well as other peripherals; the physical interfaces may include, for example, RJ45, RJ11, high definition multimedia interface (HDMI), optical, coax, FireWire, wireless, and universal serial bus (USB), or any other suitable connector. The presentation module 229 may also interact with a control device 209 for determining particular content sources that a user desires to experience. In an exemplary embodiment, the control device 209 may comprise a remote control (or other access device having control capability, such as a PC, wireless device, mobile phone, etc.) that provides a user with the ability to readily manipulate and dynamically change parameters affecting the content (including overlay instances) being viewed. In other examples, STB 201 may be configured for voice recognition such that STB 201 may be controlled with spoken utterances.

In this manner, the control device 209 may include a cursor controller (not illustrated) and/or key pad (not illustrated) for activating a displayable application, navigating through IPTV channels and/or overlay instances, as well as performing other control functions. For instance, control device 209 may be utilized to maximize an overlay instance, search for content, retrieve augmented content, modify widget parameters, or toggle through previously displayed overlay instances. Further, the control device 209 may comprise a memory (not illustrated) for storing preferences affecting the content viewed, which can be conveyed to STB 201 through an input interface 231. The input interface 231 may support any type of wired and/or wireless link, e.g., infrared, radio frequency (RF), BLUETOOTH, and the like. Thus, control device 209 may store user preferences with respect to overlay and/or augmented content, such as favorite sources, etc. Alternatively, user preferences may be tracked, recorded, or stored in STB 201 or in a network user profile repository 113. The preferences may be automatically retrieved and activated by a user at any time. It is noted that the control device 209 may be separate from STB 201 or may be integrated within STB 201 (in which case certain input interface hardware and/or software may not be necessary).

Particular embodiments enable users, via remote control, to populate or otherwise configure a user profile. For instance, a user profile application may be provided or accessed by STB 201 to enable users to populate a plurality of entry fields with user information. A user profile may include one or more customized or personalized settings that affect any aspect of media content or overlay instance accessible via STB 201. More specifically, the profile may include: subscription information (account number, user name, password, avatar, moniker, etc.), subscriber demographics (age, gender, ethnicity, location of residence, zip code, school district, community, socioeconomic status, religion, marital status, ownerships, languages, mobility, life cycles, etc.), group/organizational affiliations (e.g., political), memberships, interests, buddies, friends, cohorts, system configurations, policies, associated users, etc., as well as any other like personal information. Additionally, a user profile may include a "whitelist" specifying one or more accessible media content and/or overlay instance sources/subjects, a "blacklist" specifying one or more media content and/or overlay instance sources/subjects, as well as other equivalent customized settings, such as color schemes, active/inactive widgets, display size/position, etc.

In other embodiments, the user profile may be established using the additional access devices described earlier, e.g., PC, PDA, mobile phone, handheld device, etc. As such, user profile information may be stored in STB 201 (e.g., in memory 227) and/or at a user site repository (not illustrated) directly connected to STB 201. Additionally or alternatively, user profile information may be stored in a network-based repository (e.g., remote user profile repository 113), control device 209, and/or any other storage medium.

STB 201 may also include a correlation module 233 configured to correlate the displayable application with the user information and/or overlay content to determine the augmented content of the displayable application. For instance, an MSP 107 may provide a comprehensive, global weather forecast overlay stream. Correlation module 233 may be selectively configured to control what part(s) of the weather forecast stream are to be accepted at communication interface 221, or what amount to include as an initial widget to be presented by presentation module 229. More specifically, the correlation module 233 may only accept weather forecasts for a particular user zip code and limit the initial widget presentation to "today's" weather. The subscriber may then interact with the initial widget presentation, via control device 209, to obtain more information about the weather. Correlation module 233 may then supplement the presentation with augmented content, such as a weekly weather forecast, a video channel about weather, or selectable areas to permit the user to launch a linked program. These policies may be based on various data stored within a user profile or related to the overlay content initially presented. A more detailed explanation of the process for providing widgets including overlay and augmented content will be provided in conjunction with FIGS. 3a and 3b.

Alternatively, the functions of correlation module 233 may be network-based, i.e., provided, for instance, by the service provider network 101 or other system 100 component, such as the video processor module. Thus, the augmented content may be "proactively" tailored based on a user profile or initial overlay presentation. Similarly, augmented content may be generated "on-demand" (or "reactively" tailored) when requested by a user of STB 201.

Thus, under arrangements of FIG. 2, a user may receive and/or transmit overlay instances, e.g., widgets including content retrieved over a data network and/or augmented content, while viewing a media content production, such as a television program. For instance, notification of sports coverage, weather forecasts, traffic reports, horoscopes, daily news, commentary, community service information, etc., may be visually provided on display 215, in which a widget 205 "pops-up" to present content retrieved over a data network as it becomes available. A user may then interact with the widget to obtain augmented content. Alternatively, overlay and/or augmented content may be obtained periodically (based on a predetermined time interval), continuously, or on an "on-demand" basis.

Figure 3B:
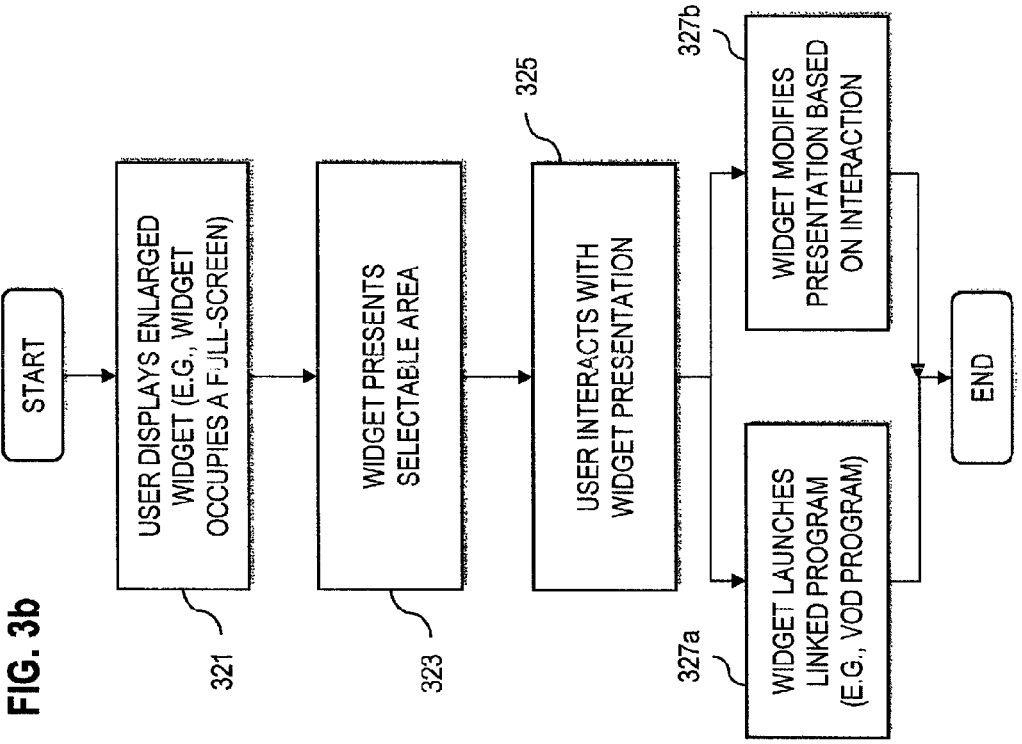
FIGS. 3a and 3b are flowcharts of processes for providing expanded widgets using the set-top box of FIG. 2, according to exemplary embodiments.
Figure 3A:
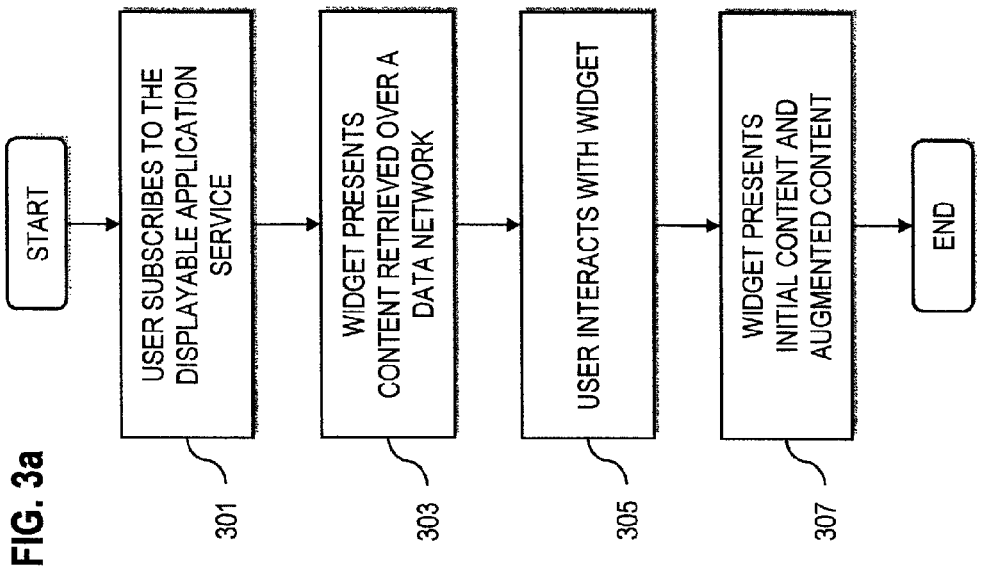

The operation of STB 201, control device 209, and widget 205 will now be explained with respect to content retrieved over a data network and augmented content. FIGS. 3a and 3b are flowcharts of processes for providing expanded widgets using the set-top box of FIG. 2, according to exemplary embodiments. The processes of FIGS. 3a and 3b will be described in conjunction with FIGS. 4 and 5.

Figure 4:
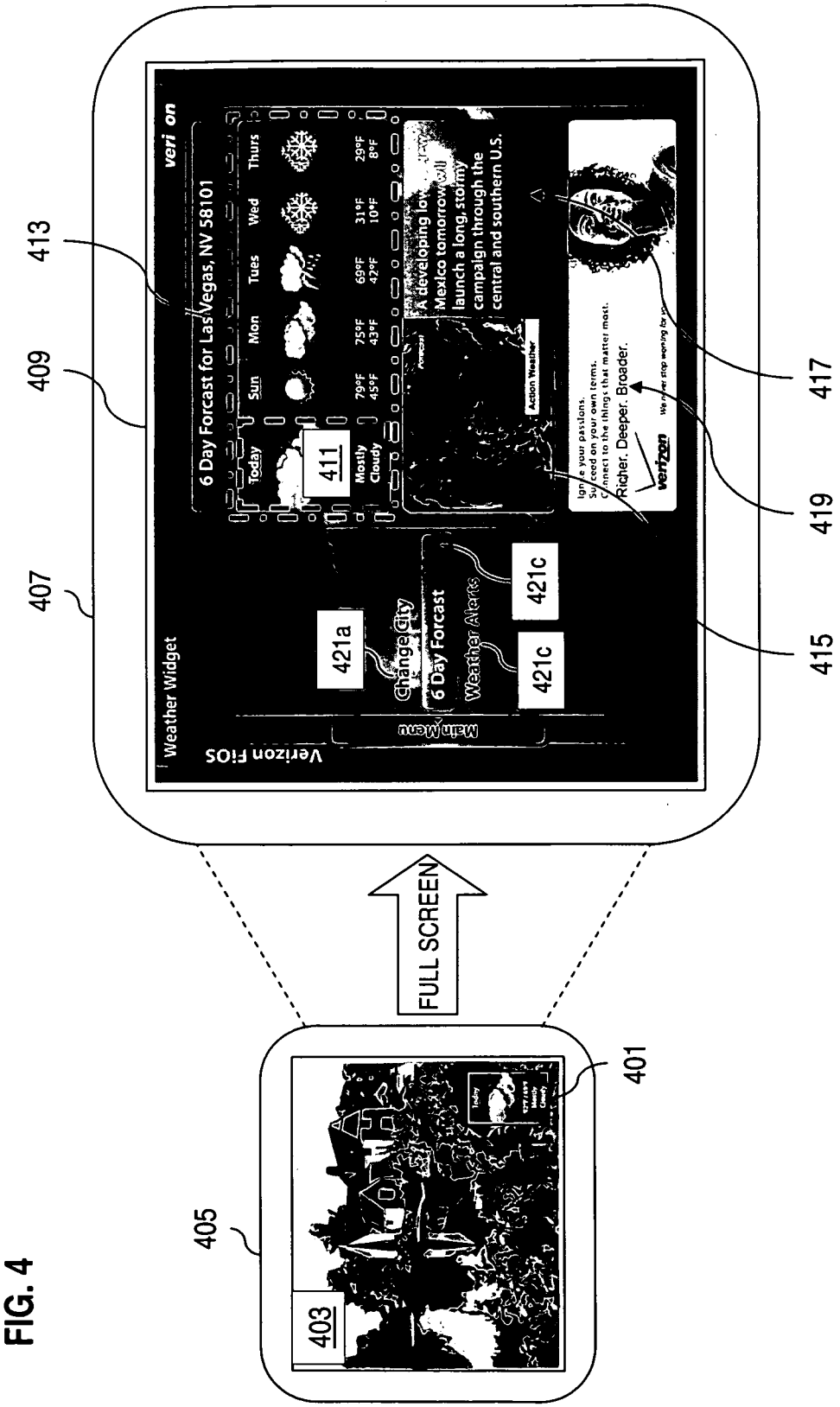
FIG. 4 is a diagram of a television display providing an expanded weather widget, according to an exemplary embodiment.

In particular, FIG. 3a shows a process for providing "proactive" augmented content using the set-top box of FIG. 2, according to an exemplary embodiment. FIG. 4 is a diagram of a television display providing an expanded weather widget, according to an exemplary embodiment.

In step 301, a new user subscribes to the displayable application service utilizing STB 201 (which is capable of processing multiple video channels or streams). That is, the user can interact with STB 201 using the control device 209 to activate software resident on the STB 201. The software may then establish a connection to the service provider network 101 through an Internet Protocol (IP) based connection. The user may register as a new subscriber of the displayable application service, as well as obtain sufficient authentication information for establishing future sessions. Once registered and/or authenticated, the STB 201 may communicate with MSP 107 for customizing a user profile to embody user-defined attributes or policies for searching, receiving, transmitting, and/or generating overlay and augmented content to be presented via widget 205. These parameters can include information, such as: which one or more content sources to receive information from, which policy within a user profile should govern, time limits for transmitting content, allowances for "pop-up" content to be received, other devices to receive content at, etc.

After generating a user profile, an MSP 107 may store a list of subscribers to the service, as well as, a list of subscriber STB identifiers, authentication information, and user-defined profiles. In step 303, the subscriber may interact with STB 201 using control device 209 to enable receipt of widgets including overlay content retrieved over a data network and augmented content. Having at least one activated subscriber account, an MSP 107 may retrieve overlay content, for instance weather forecast information, from various content sources. This information may be retrieved specifically tailored to individual subscribers utilizing information stored within a user profile (e.g., a weather forecast for zip code 58101), or may be exhaustive (e.g., grouped weather forecasts for multiple zip codes). In alternative embodiments, an MSP 107 may generate its own overlay content.

After retrieving sufficient information, MSP 107 may transmit an overlay instance to one or more STBs, e.g., STB 201, based the information within the user's profile. Such transmission to STB 201 may be interlaced or concurrent with the media content, e.g., broadcast video, or provided as a separate transmission. In alternative embodiments, overlay content may be directly transmitted from a third-party source, such as content provider system 123. Thus, upon predefined triggering events (i.e., policy provisions, such as available weather forecasts) as established within the user-defined profile, the MSP 107 and/or third-party sources may generate signals or streams of data embodying media content and/or overlay content. These signals may be transmitted to one or more STBs 105a-105n registered to receive such information.

STB 201, for instance, will receive data 211 at communication interface 221. Correlation module 233 may, as appropriate, correlate the information within the data transmission with user information stored in the user's profile. In alternative embodiments, correlation may occur before transmission utilizing a network-based correlation module. Correlation processes are more fully described with respect to FIGS. 3b, 7a, and 7b.

Next, presentation module 229 may format the received data for presentation to the user, wherein the formatted data includes a video broadcast and overlay content. The formatted signal is presented on display 215 including a "pop-up" widget 205 presenting the overlay content on the video broadcast. For instance (as seen in FIG. 4), a pop-up weather widget 401 may present a correlated weather forecast to the user's home address, i.e., "today's" weather forecast including high/low temperatures and visibility for zip code "58101" overlaid on a video broadcast 403. Per step 305, the user may interact with pop-up widget 401 to obtain augmented content, such as an extended six day forecast. User interaction may occur via control device 209, e.g., by depressing a "widget" button or manipulating a cursor to "click" widget 401. In voice activated embodiments, the user may provide uttered commands, e.g., by speaking "more weather." User interaction causes the display application to occupy an enlarged area of display 405. In the depicted embodiment, the displayable application causes presentation module 229 to enlarge widget 401 to present display 405 as display 407, wherein the weather widget 409 now occupies a full-screen.

In step 307, the full-screen weather widget 409 includes the overlay content 411 and augmented content. The augmented content may be based on the overlay content of weather widget 401, a policy within the user's profile, and/or a network/system policy, e.g., the desire of a system administrator 119. As shown, augmented content includes a six day weather forecast 413, a region 415 presenting a video channel about weather (e.g., a weather radar or latest report from a weather broadcaster), an information region 417 about the forecasted weather, a targeted advertisement 419, and selectable areas 421a-c. The selectable areas include an icon 421a for changing the weather forecast to another geographic region, an icon 421b for presenting the six day weather forecast, and an icon 421c for obtaining weather alerts. Augmented content in the form of targeted advertisements will be more fully described with respect to FIGS. 7a-8.

FIG. 3b is a flowchart of a process for providing "reactive" widgets using the set-top box of FIG. 2, according to an exemplary embodiment. In step 321, an authenticated subscriber interacts with STB 201 to acquire an enlarged or full-screen widget, e.g., weather widget 409. Per step 323, the displayable application causes weather widget 409 to include content retrieved over a data network and augmented content. As such, weather widget 409 may present a selectable area (e.g., an icon) to permit the subscriber to launch a linked program, for instance a VOD program about weather. For example, Wednesday and Thursday of the six day forecast anticipate a rare desert snowstorm for Las Vegas, Nev. Accordingly, the VOD program may comprise a Discovery Channel® documentary about rare desert snowstorms. In step 325, the subscriber may interact with the selectable area utilizing, for instance, control device 209. Per step 327a, the displayable application may cause presentation module 229 to format and/or present the VOD program in weather widget 409 or may cause presentation module 229 to revert back to display 405 (with or without weather widget 401).

In alternative embodiments, selecting the icon (in step 325) may launch a linked program (in step 327a) configured to search for augmented content, such as VOD documentaries. In this case, the process reverts back to step 325 to permit the subscriber to interact with the launched program. A search program may permit the subscriber to issue an augmented content request to MSP 107 or other third-party content provider by selecting the icon via control device 209. The search program may enable the user to generate a request concerning one or more subject areas or keywords, such as "rare desert snowstorms" and "Nevada." Alternatively, the linked program may provide a related list of augmented content or search parameters based on the content already presented in weather widget 409.

In this manner, the displayable application can transmit metadata describing the presented content to MSP 107, a third party content source, or a network interface in order to receive a list of related augmented content or relevant search terms. The network-based correlation module may also utilize information within a user profile to refine the results. For example, the correlation module may extract a zip code from the user's profile to search for VOD documentaries concerning rare desert snowstorms in Las Vegas (e.g., zip code 58101). Alternatively, correlation may occur at STB 201 via correlation module 223. Correlation module 223 may selectively accept only those responses correlated to user information or content within weather widget 409. In response to the subscriber's interaction (per step 327*b*), the displayable application may cause presentation module 229 to format and/or present the augmented content results via display 215.

Figure 5:
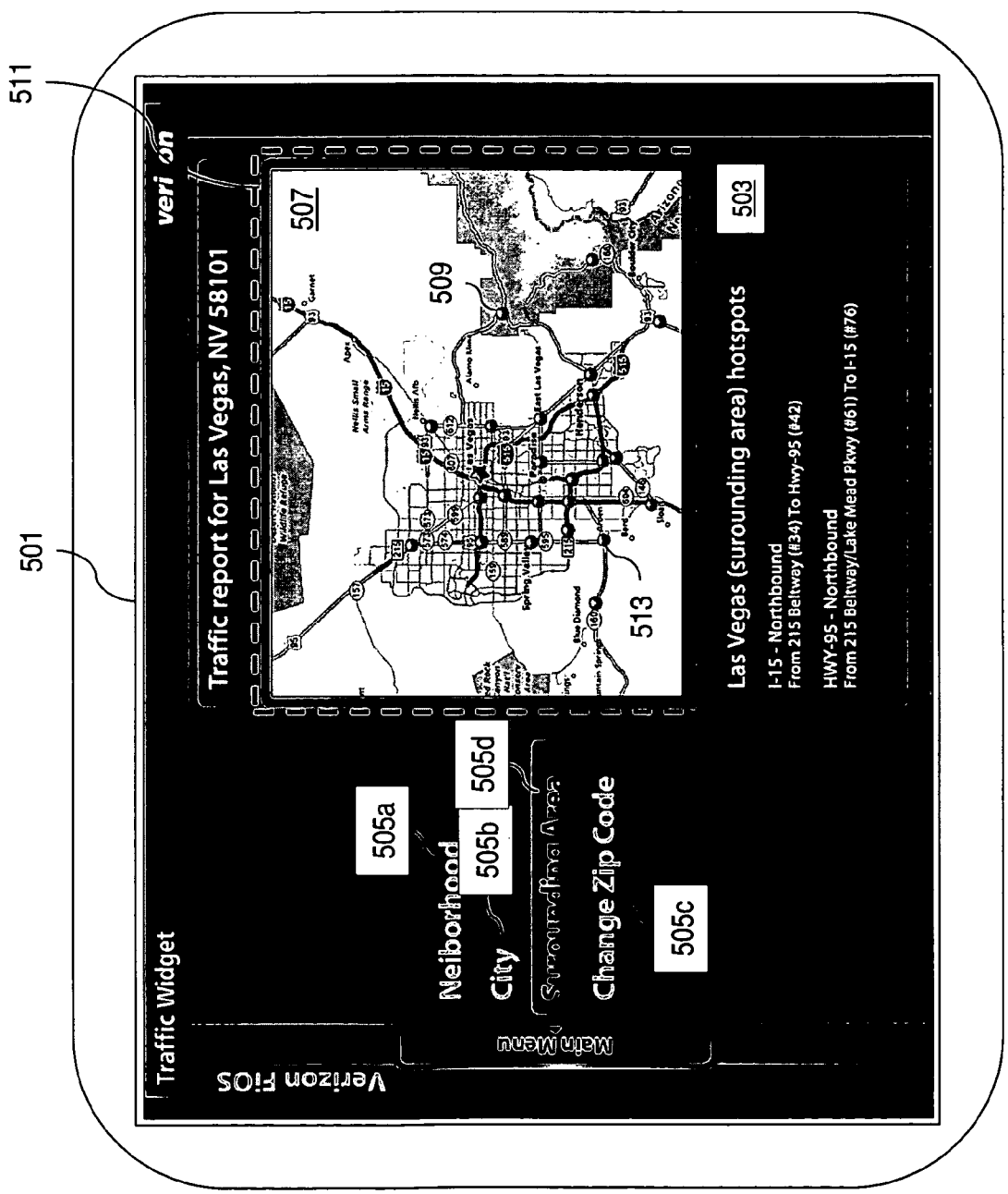
FIG. 5 is a diagram of a television display providing an expanded traffic widget, according to an exemplary embodiment.

Other embodiments enable users to modify the presentation of the displayable application utilizing selectable areas. With continued reference to FIGS. 2 and 3*b*, FIG. 5 is a diagram of a television display providing an expanded traffic widget, according to an exemplary embodiment. Reverting to step 321, an authenticated subscriber may interact with STB 201 to acquire an enlarged or full-screen traffic widget 501 including a traffic report for Las Vegas. Per step 323, the displayable application causes traffic widget 501 to include content retrieved over a data network and augmented content. In one embodiment, the augmented content may comprise an audile presentation, i.e., media source 203 may stream audio retrieved over the Internet. Alternatively, augmented content may take a narrative form, such as congested "hotspots" as depicted in information region 503, or a video broadcast region (not illustrated) presenting traffic conditions.

Further, augmented content of traffic widget 501 may include a plurality of selectable areas to permit the subscriber to interactively modify the augmented content, per steps 325 and 327*b*. For instance, selectable icons 505*a-d* permit the user to modify the geographic region over which the traffic report is related. More specifically, one or more correlation modules may gather traffic reports based on predefined criteria, such as traffic reports for the user's neighborhood or surrounding city. As such, interaction with selectable icons 505*a* and 505*b* may allow users to toggle between neighborhood and city traffic reports, respectively. Selectable icon 505*c* enables users to vary the zip code to ascertain traffic conditions in other regions.

Meanwhile, selectable icon 505*d* may launch a mapping program 507 overlaid with traffic information. Program 507 may be proprietary to MSP 107 or a mashup application utilizing maps/content from a third-party source, such as Google. In this manner, roadways may be color-coded to convey varying levels of traffic congestion. Interaction with selectable traffic icons, e.g., icon 509, may enable region 511 to present augmented content in the form of real-time street-level images or videos of particular roadways. Alternatively, additional pop-up widgets may present the same. A user may interact with "hotspot" icons, e.g., icon 513, to obtain driving directions to/from the location. Interaction with other icons may cause marketplace information to be supplied, such as information about local restaurants, businesses, gas stations, etc. In still further embodiments, traffic widget 501 may enable users to obtain driving directions between specified addresses that minimize interaction with traffic congested roadways.

Thus, under the processes of FIGS. 3*a* and 3*b*, embodiments of the displayable application can cause STB 201 to present augmented content including targeted advertisements, streaming audio, related narratives, or additional widgets. Other embodiments enable STB 201 to tune to a particular video broadcast channel for widget display (e.g., linear programming), permit the user to launch linked-programming (e.g., VOD programming), allow the user to launch linked-programs (e.g., search programs, map programs), as well as present content retrieved over a data network. Further, various embodiments create a consolidated presentation of overlay content retrieved over a data network and augmented content that is relevant and consistent for the subscriber. Accordingly, a user may seamlessly obtain a litany of related information, from a variety of sources, via multiple communications media.

Figure 6:
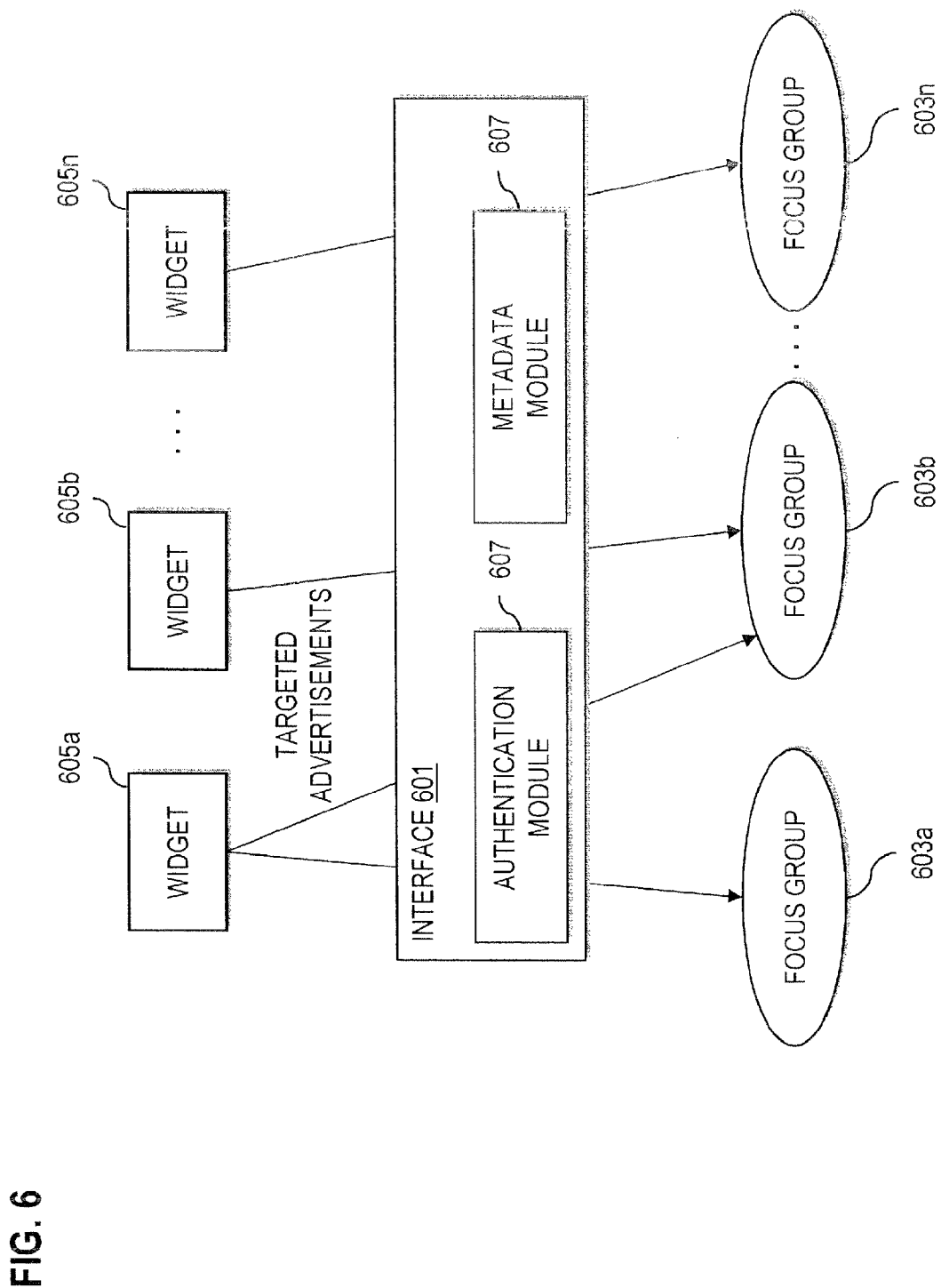
FIG. 6 is diagram of an interface for providing targeted advertisements via expanded widgets, according to various embodiments.

As explained earlier, system 100 may be utilized to distribute augmented content in the form of targeted advertisements. FIG. 6 is diagram of an interface for providing targeted advertisements via widgets, according to various embodiments. It is contemplated that interface 601 may embody many forms and include multiple and/or alternative components.

As depicted, an interface 601 may be included within system 100 to afford content providers the ability to distribute augmented content in the form of targeted advertisements intended for a plurality of focus groups 603*a*-603*n* using widgets, e.g., widgets 603*a*-603*n*. That is, interface 601 may group or categorize at least one subscriber in various focus groups 603*a*-603*n* based on user information, overlay content, or augmented content, as well as according to conventional unsolicited methods. For instance, focus group 603*a* may be based on similar demographic information, e.g., a logical mapping of subscribers of a particular age range, geographic region, and interested in exercising. Focus group 603*b* may be created according to overlay content, e.g., a logical mapping of users receiving overlay content regarding a fantasy football league. Meanwhile, focus group 603*n* may be established according to augmented content, i.e., a logical mapping of users experiencing a video broadcast about sports cars. In other embodiments, advertisers may conduct mass advertisement campaigns, i.e., distributing unsolicited advertisements to as many subscribers as possible.

An authentication module 607 may provide similar functions to the network authentication module of FIG. 1. Namely, authentication module 607 may be configured to perform authentication services to determine whether users or advertisers are subscribers to or providers of a particular focus group 603*a*-603*n*. Authentication schemes may require a user name and password, a key access number, a unique machine identifier (e.g., MAC address), etc., as well as combinations thereof. Thus, once an STB or advertiser is authenticated, connections between STBs (e.g., STBs 105*a*-105*n*) and advertisement sources may be directly established. As previously described, multiple rights sessions may exist concurrently or closed and created in a linear fashion. Thus, exemplary embodiments of interface 601 may enable authentication module 607 to authenticate an advertiser to allow them search content metadata or user information to determine which advertisements are to be presented to a plurality of STBs, focus groups, or members of one or more focus groups.

In certain embodiments, interface 601 may include a metadata module 609 for providing metadata concerning advertisers that can be searched by STB users. Accordingly, subscribers may utilize metadata about the advertisers to create "whitelists" for receiving advertisements relating to certain products/services or to establish "blacklists" to prevent unsolicited advertisements. Various other embodiments may utilize metadata module 609 to correlate advertisements with particular members of the one or more focus groups 603*a*-603*n*, i.e., to target advertisements to specific STB users within one or more focus groups 603a-603n. Advertisers may use metadata concerning overlay and augmented content to correlate advertisements with the content being experienced by subscribers. Further, metadata module 609 may also be used to create focus groups 603a-603b, i.e., categorizing users according to metadata describing information in corresponding user profiles. Thus, embodiments of interface 601 may structure, encode, and provide metadata to describe characteristics of the advertisement-bearing entities, STB users, and focus groups to aid in the creation, identification, discovery, assessment, and management of targeted advertisements.

As such, targeted advertisements may be distributed to a plurality of users included within at least one focus group. For instance, widget instances 605a-605n may encapsulate augmented content in the form of targeted advertisements. Widget 605a may concern "energy drinks," widget 403b may deal with "football paraphernalia," and widget 603n may relate to "sports car manufacturers." In this manner, focus group 603a (i.e., users with similar demographics and interested in exercising) may receive widget 605a (i.e., energy drink advertisements), focus group 603b (i.e., users similarly receiving overlay content regarding a fantasy football league) may receive widgets 605a and 605b (i.e., energy drink and football paraphernalia advertisements), and community 603n (i.e., users experiencing a video broadcast about sports cars) may receive widget 605n (i.e., sports car manufacturer advertisements).

In each instance, a correlation module (e.g., module 233 of FIG. 2) may be utilized for specializing widget presentations at the displays of the focus groups. For instance, subscribers receiving widget 605n may be provided with particular car manufacturer advertisements based on, for example, the user's annual income.

Figure 7B:
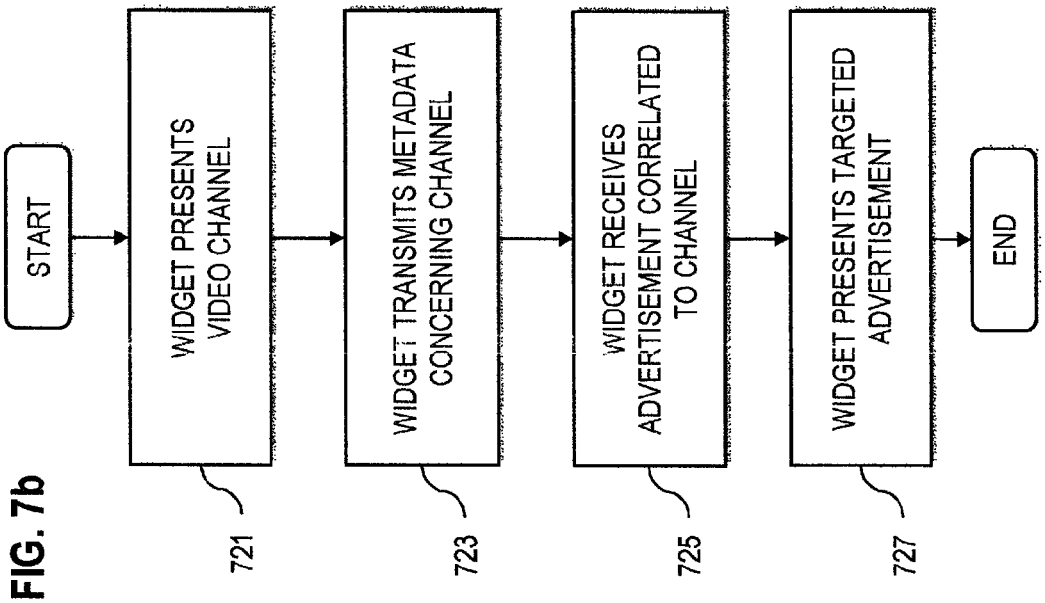
FIGS. 7a and 7b are flowcharts of processes for providing targeted advertisements using the interface of FIG. 6, according to exemplary embodiments.
Figure 7A:
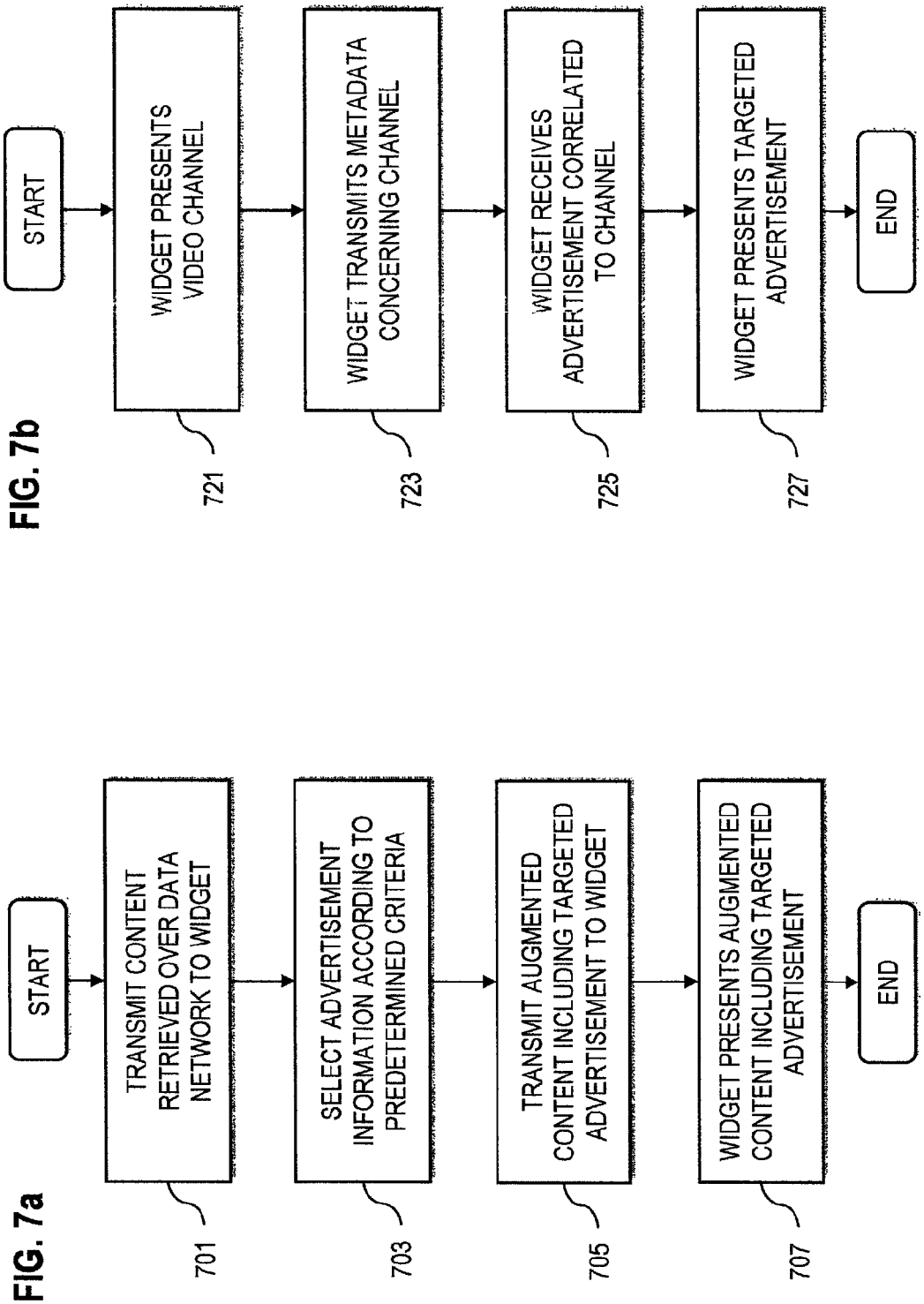
Figure 8:
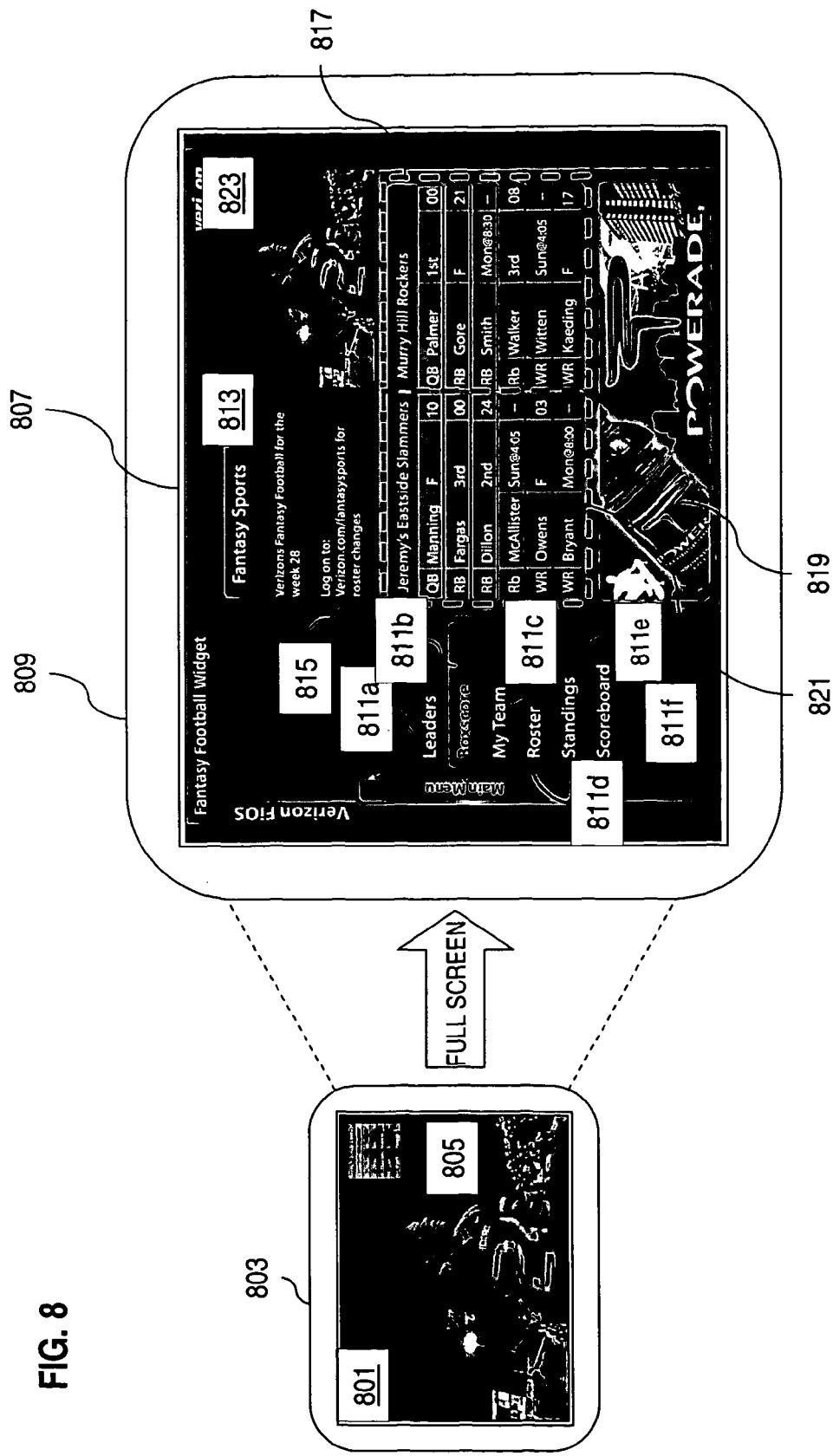
FIG. 8 is a diagram of a television display providing targeted advertisements via expanded widgets, according to various embodiments.

With additional reference to FIGS. 1, 2, and 8, the operation of interface 601 will now be explained with respect to an advertisement server. FIGS. 7a and 7b are flowcharts of processes for providing targeted advertisements using the interface of FIG. 6, according to exemplary embodiments.

FIG. 7a shows a process for targeting and distributing advertisements to subscribers, according to an exemplary embodiment. FIG. 8 is a diagram of a television display providing targeted advertisements via expanded widgets, according to various embodiments. In step 701, a media source 203 (e.g., MSP 107) transmits a first data stream 211 including media content, e.g., broadcast video of a football game 801, for presentation on display 803 via STB 201. Concurrent with the first data stream, media source 203 also transmits overlay content retrieved over a data network (e.g., fantasy football boxscores) for presentation via fantasy football widget 805. The subscriber can interact with widget 805 (via control device 209) to obtain augmented content via fantasy football widget 807 occupying a full screen of display 809. The displayable application will request augmented content from MSP 107 or other third-party source, such request asking for information including selectable icons 811a-811f, narrative information region 813 including selectable link 815, augmented boxscores 817, and targeted advertisement 819.

In certain embodiments, MSP 107 selects advertisement information targeted to a subscriber according to predetermined criteria, per step 703. The criteria may be based on STB devices, subscriber information, user policies/profiles, established focus groups, content lineup, specific content being experienced, metadata descriptions, geospatial characteristics, presentation frequency, key value identifiers, etc. As such, MSP 107 may obtain metadata from metadata module 609 before selecting appropriate advertisements. This enables MSP 107 to further differentiate between available content utilizing those metadata methods described earlier. It is contemplated that advertisements can be retrieved from MSP 107, repository 115, or server 117 acting as an advertisement server. Alternatively, MSP 107 can communicate with server 117, wherein server 117 selects the appropriate content to distribute. For instance, selection call occur corresponding to a subscriber's STB (e.g., STB 201).

More specifically, sever 117 may be associated with MSP 107 or a third-party source. A management interface (not illustrated) and tracking system (not shown) can be included at server 117 for compiling statistics or gathering metadata from interface 601. Statistics may include information such as advertisement performance (weekday vs. weekend, regional differentiations, etc.), presentation frequency to subscriber(s), as well as other equivalent parameters. Server 117 can also include a distribution module (not shown) to directly transmit advertisements to MSP 107 and/or STBs 105a-105n. Further, server 117 can store advertisements at a database, such as repository 115. In the alternative, a database may be collocated with, or integrated as a part of, server 117.

As such, the selection process may result in specifically tailored advertisements to individual subscribers utilizing user information (e.g., membership in a fantasy football league), or may be exhaustive (e.g., general sports advertisements). In step 705, MSP 107 or server 117 transmits the augmented content, including the targeted advertisements, to authenticated STBs (e.g., 105a-105n). As previously described, interface 601 can be utilized to construct focus groups 605a-605n to facilitate or enhance advertisement distribution. Further, the network-based correlation module may be utilized to further target advertisements to particular subscribers, such as individual subscribers comprising focus group 605n.

Upon receiving the targeted advertisement at communication interface 221, correlation module 233 may, as appropriate, further target the information utilizing information stored in the user's profile. In step 707, presentation module 229 formats and/or presents the augmented content in fantasy football widget 807. Widget 807 presents the received augmented content, including targeted advertisement 819 via display 809. Fantasy football widget 807 also includes overlay content 821 presented via widget 805 and video channel region 823 presenting football game 801. In alternative embodiments, the media source 203 may transit the overlay and augmented content in a second data stream, i.e., separate from the first stream. Still further, the media content, overlay content, and augmented content may be transmitted from various sources and combined for presentation via presentation module 229.

Additional augmented content may be obtained via interaction with selectable areas 811a-811f. Interaction with icon 811a enables users to view current fantasy football leaders. Selecting icon 811b presents boxscores. Icon 811c allows users to manipulate various parameters of the subscriber's fantasy football team, such as trading players, participating in a league draft, etc. A standings icon 811e enables users to view a broad range of fantasy football statistics. Moreover, interaction with scoreboard icon 811f can provide real-time scores of current football games, as well as a tabulation of fantasy football points.

Particularly, when a user selects icon 811b boxscores for "Jeremy's Eastside Slammers" and "Murry Hill Rockers" are displayed based on a network policy or user profile. Narrative information region 813 provides information concerning fantasy football league play (e.g., displays the current "week" of the season) and a selectable link 815 to allow the subscriber to navigate to an Internet webpage concerning fantasy football.

For instance, link 815 may allow users to "log on" to an application service provider's (ASP) sever to manipulate fantasy football rosters. For avid football fanatics, video broadcast channel region 823 enables subscribers to continually view broadcasted football games, especially those affecting the subscriber's fantasy football score.

MSP 107 and/or server 117 may periodically update or modify targeted advertisement 819. For instance, server 117 may utilize information from metadata module 609 and the processes of a correlation module (e.g., the network-based correlation module) to correlate targeted advertisements with content presented via widget 807. FIG. 7b shows a process for correlating targeted advertisements to augmented content, according to an exemplary embodiment. In step 721, fantasy football widget 807 includes the broadcast video channel region 823 presenting football game 801. Per step 723, the displayable application may transmit metadata, via communication interface 233, concerning the content displayed. For instance, the illustrated football player and his son might be drinking a "Powerade" energy drink at the end of the football game. Accordingly, the displayable application may extract such occurrence from the data stream, utilize correlation module 233 to construct a metadata description of the occurrence, and transmit the metadata to, for instance, server 117 via interface 601. Alternatively, the video processor of the service provider network 101 may transmit metadata to interface 601 concerning products or services appearing in media content, overlay content, or augmented content transmitted to particular STBs 105a-105n. Server 117 may utilize this information in conjunction with interface 601 and the network-based correlation module to transmit targeted advertisements to subscribers.

At step 725, communication interface 221 receives a "Powerade" advertisement based on the video channel presentation. In alternative embodiments, server 117 may group multiple sports drink advertisements into the transmission, such as "Powerade" banners, "Gatorade" banners, "Accelerade" banners, etc. Correlation module 233 may then select the appropriate banner advertisement to present via display 809 based on user preferences extracted from a user profile. Per step 727, presentation module 229 formats and/or updates targeted advertisement 819 to display an appropriate advertisement, e.g., "Powerade" banner 819.

The processes described herein for overlay and augmented content reception, transmission, and correlation may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
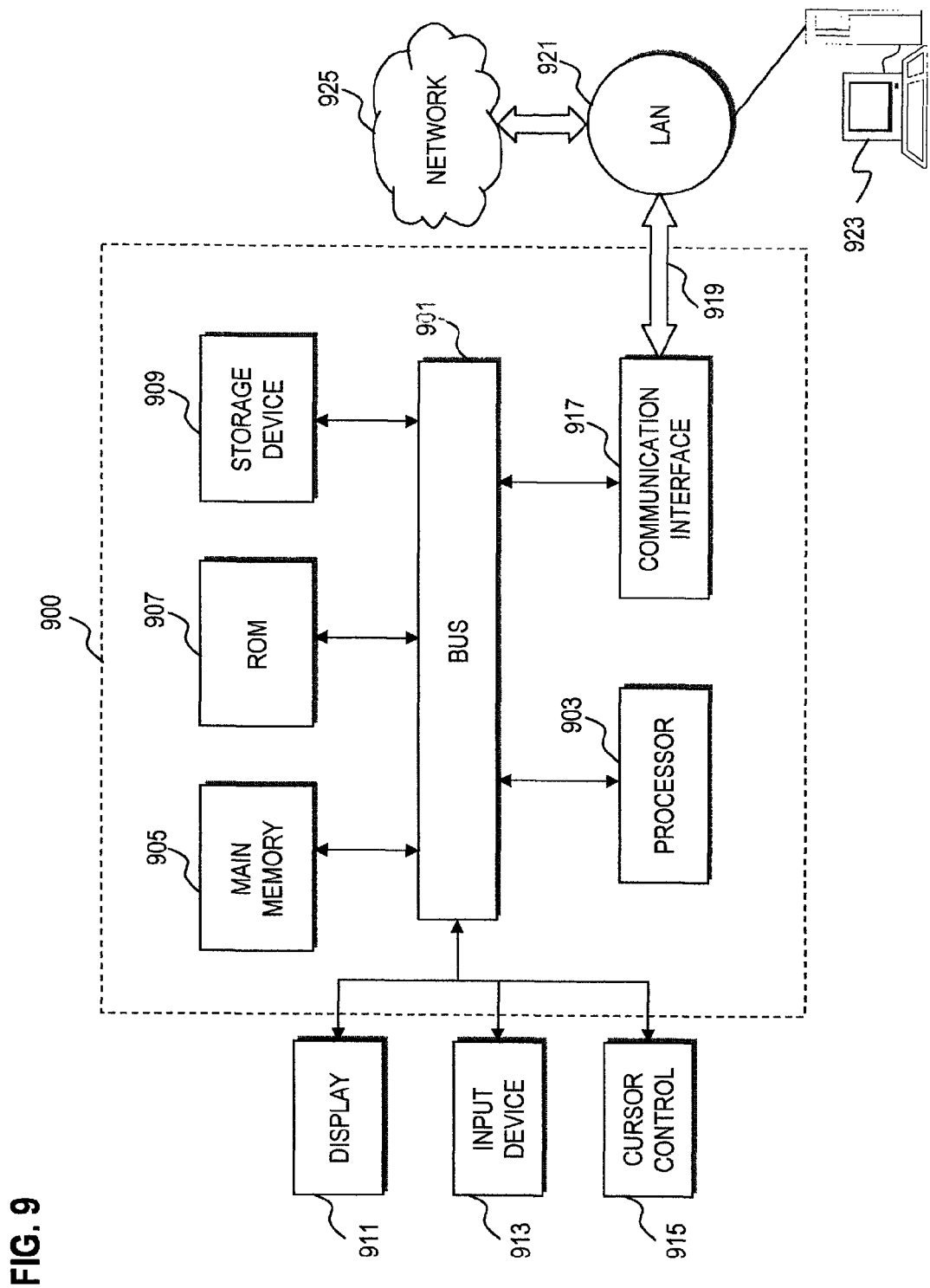
FIG. 9 is a diagram of a computer system that can be used to implement various exemplary embodiments.

FIG. 9 illustrates computing hardware (e.g., computer system) 900 upon which an embodiment according to the invention can be implemented. The computer system 900 includes a bus 901 or other communication mechanism for communicating information and a processor 903 coupled to the bus 901 for processing information. The computer system 900 also includes main memory 905, such as a random access memory (RAM) or other dynamic storage device, coupled to the bus 901 for storing information and instructions to be executed by the processor 903. Main memory 905 can also be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computer system 900 may be coupled via the bus 901 to a display 911, such as a cathode ray tube (CRT), liquid crystal display, active matrix display, or plasma display, for displaying information to a computer user. An input device 913, such as a keyboard including alphanumeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for controlling cursor movement on the display 911.

According to an embodiment of the invention, the processes described herein are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement the embodiment of the invention. Thus, embodiments of the invention are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, a telephone modem, or any other communication interface to provide a data communication connection to a corresponding type of communication line. As another example, communication interface 917 may be a local area network (LAN) card (e.g. for Ethernet™ or an Asynchronous Transfer Model (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a PCMCIA (Personal Computer Memory Card International Association) interface, etc. Although a single communication interface 917 is depicted in FIG. 9, multiple communication interfaces can also be employed.

The network link 919 typically provides data communication through one or more networks to other data devices. For example, the network link 919 may provide a connection through local network 921 to a host computer 923, which has connectivity to a network 925 (e.g. a wide area network (WAN) or the global packet data communication network now commonly referred to as the "Internet") or to data equipment operated by a service provider. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an embodiment of the invention through the network 925, the local network 921 and the communication interface 917. The processor 903 may execute the transmitted code while being received and/or store the code in the storage device 909, or other non-volatile storage for later execution. In this manner, the computer system 900 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    correlating content based on a user profile comprising user-defined attributes and policies for the correlation of the content, wherein the user-defined attributes and policies further govern presentation settings for the content to be presented and augmented via a widget, and the presentation settings include one or more color schemes;
    extracting, at a set-top box, an occurrence of an object appearing in the correlated content;
    constructing, at the set-top box, a metadata description of the occurrence;
    transmitting the metadata description from the set-top box;
    receiving, at the set-top box, augmented content for a widget in response to the transmission of the metadata description, wherein the augmented content is generated in real time and on demand in response to a request by a user of the set-top box;
    presenting, via the set-top box, the widget with the augmented content overlaid on a video broadcast at one or more portions of a screen based upon the presentation settings, wherein the content is retrieved over a data network; and
    in response to one voice command of the user for more of the augmented content, augmenting relevant content supplemental to the augmented content into a presentation of the widget with the augmented content, and expanding the presentation over the whole screen,
    wherein the widget includes a selectable area to permit the user to modify the augmented content or launch a linked program, and the method further comprising:
    receiving a request of one of the users to search for an on-demand program corresponding to the content of the augmented content, in response to the user launching the linked program;
    extracting one or more attributes from a corresponding profile of the one of the users to refine a search for the on-demand program; and
    presenting, via the set-top box, the widget with the augmented content embedded with the on-demand program, wherein the on-demand program includes a program with historical content corresponding to the content of the augmented content.

2. A method according to claim 1, wherein the augmented content includes at least one advertisement targeted to a subscriber of the set-top box, a video channel, or a combination thereof, and the method further comprising:
    encapsulating the advertisement into the augmented content, wherein the advertisement is selected based on the augmented content in real-time, and
    presenting, via the set-top box, the widget with the augmented content encapsulated with the advertisement.

3. A method according to claim 2, further comprising:
    determining users experiencing the video broadcast;
    determining the users as a focus group;
    including a focus group identifier into user profiles of the users in the focus group; and
    determining the advertisement based upon the user profiles.

4. A method according to claim 3, wherein the program with historical content includes a documentary corresponding to the content of the augmented content.

5. A method according to claim 1, wherein the widget occupies a full-screen display.

6. A method according to claim 1, wherein the widget includes a selectable area to permit the user to launch a linked program.

7. A method according to claim 6, wherein the linked program includes a video-on-demand program.

8. A method according to claim 1, further comprising:
    selectively storing, at the set-top box, only augmented content correlated to the user profile.

9. A method according to claim 1, wherein the user profile includes an attribute for at least one of searching, receiving, transmitting, and generating the augmented content, a policy for at least one of searching, receiving, transmitting, and generating the augmented content, or a combination thereof.

10. A method according to claim 1, wherein the user profile includes one or more time limits for transmitting content, one or more allowances for pop-up content to be displayed, one or more other devices to receive the content, and a combination thereof.

11. A method according to claim 1, wherein the step of correlating the content with the user profile includes:
    extracting one or more search criteria from the user profile and a theme of the widget; and
    searching for the correlated content based on the one or more search criteria, wherein the widget is presented with the correlated content embedded therein.

12. A method according to claim 11, wherein the widget is presented with one or more selectable areas embedded therein, the method further comprising:
    modifying the correlated content and the augmented content based upon user selection of the selectable areas, wherein the widget is presented with the modified correlated content and the modified augmented content embedded therein in one window.

13. A method according to claim 1, further comprising:
    overlaying the augmented content onto a map; and
    presenting, via the set-top box, the widget with the augmented content onto the map, wherein the augmented content includes real-time images and market place information.

14. A method according to claim 13, wherein the augmented content is associated with weather, traffic, or a combination thereof.

15. A method according to claim 1, wherein the presentation settings further include one or more display sizes, one or more display positions, or a combination thereof.

16. A method according to claim 1, wherein the widget includes a mapping program overlaid with traffic information as the augmented content, and the traffic information includes traffic congestion presented in color-code levels.

17. A method according to claim 16, wherein the traffic information includes selectable traffic icons for triggering real-time street-level roadway images or videos, driving directions to or from a location, and driving directions to or from a location avoiding traffic congestion.

18. A set-top box comprising:
    at least one memory;
    at least one processor configured to correlate content based on a user profile comprising user-defined attributes and policies for the correlation of the content, to extract an occurrence of an object appearing in the correlated content, to construct a metadata description of the occurrence, to transmit the metadata description from the set-top box, and to receive augmented content for a widget in response to the transmission of the metadata description, wherein the augmented content is generated in real time and on demand in response to a request by a user of the set-top box, the user-defined attributes and policies further govern presentation settings for the content to be presented and augmented via the widget, and the presentation settings include one or more color schemes; and
    a presentation module configured to present the widget with the augmented content overlaid on a video broadcast at one or more portions of a screen based upon the presentation settings, wherein the content is retrieved over a data network,
    wherein the at least one processor is further configured to augment relevant content supplemental to the augmented content into a presentation of the widget with the augmented content and to expand the presentation over the whole screen, in response to one voice command of the user for more of the augmented content, and
    wherein the widget includes a selectable area to permit the user to modify the augmented content or launch a linked program, and the at least one processor is further configured to:
    receive a request of one of the users to search for an on-demand program corresponding to the content of the augmented content, in response to the user launching the linked program;
        extract one or more attributes from a corresponding profile of the one of the users to refine a search for the on-demand program; and
        cause the presentation module to present the widget with the augmented content embedded with the on-demand program, wherein the on-demand program includes a program with historical content corresponding to the content of the augmented content.

19. A set-top box according to claim 18, wherein the augmented content includes at least one advertisement targeted to a subscriber of the set-top box, a video channel, or a combination thereof.

20. A set-top box according to claim 18, wherein the widget includes a selectable area to permit the user to launch a linked program.

21. A set-top box according to claim 20, wherein the linked program includes a video-on-demand program.

22. A method comprising:
    correlating, at a set-top box, content based on a policy defined by a user for displaying and augmenting the content via a widget, wherein the content is received over a data network and the policy includes one or more presentation color scheme settings;
    extracting, at the set-top box, an occurrence of an object appearing in the correlated content;
    constructing, at the set-top box, a metadata description of the occurrence;
    transmitting the metadata description from the set-top box;
    receiving, at the set-top box, augmented content for a widget in response to the transmission of the metadata description, wherein the augmented content is generated in real time and on demand in response to a request by a user of the set-top box;
    presenting, via the set-top box, the widget with the augmented content overlaid on a video broadcast at one or more portions of a screen based upon the one or more presentation color scheme settings; and
    in response to one voice command of the user for more of the augmented content, augmenting relevant content supplemental to the augmented content into a presentation of the widget with the augmented content, and expanding the presentation over the whole screen,
    wherein the widget includes a selectable area to permit the user to modify the augmented content or launch a linked program, and the method further comprising:
    receiving a request of one of the users to search for an on-demand program corresponding to the content of the augmented content, in response to the user launching the linked program;

extracting one or more attributes from a corresponding profile of the one of the users to refine a search for the on-demand program; and presenting, via the set-top box, the widget with the augmented content embedded with the on-demand program, wherein the on-demand program includes a program with historical content corresponding to the content of the augmented content.

23. A method of claim 22, wherein the widget includes a selectable area to permit the user to modify the augmented content or launch a linked program.

24. A method of claim 23, further comprising:
transmitting a modifying request to modify the augmented content in response to user interaction with the selectable area; and
receiving modified augmented content to the set-top box, wherein the widget is configured to update the presentation.

25. A method of claim 23, further comprising:
transmitting a launching request to launch a linked program in response to user interaction with the selectable area,
wherein the linked program includes a video-on-demand program.

26. A method according to claim 22, further comprising:
providing, at the set-top box, advertisement information targeted to the user based on information corresponding to the user,
wherein the widget includes the advertisement information in the widget.

27. A method according to claim 26, wherein the advertisement information is provided by the service provider or an authenticated third-party source.

28. A method according to claim 22, wherein the widget includes a selectable area to permit the subscriber to obtain additional augmented content, launch a linked program, or navigate to a website.

29. A set-top box comprising:
at least one memory;
at least one processor configured to correlate content based on a policy defined by a user for displaying and augmenting the content via a widget, to extract an occurrence of an object appearing in the correlated content, to construct a metadata description of the occurrence, wherein the policy includes one or more presentation color scheme settings; to transmit the metadata description from the set-top box, and to receive augmented content for a widget in response to the transmission of the metadata description, wherein the augmented content is generated in real time and on demand in response to a request by a user of the set-top box; and
a presentation module configured to present the widget with the augmented content overlaid on a video broadcast at one or more portions of a screen based upon the one or more presentation color scheme settings,
wherein the at least one processor is further configured to augment relevant content supplemental to the augmented content into a presentation of the widget with the augmented content and to expand the presentation over the whole screen, in response to one voice command of the user for more of the augmented content, and
wherein the widget includes a selectable area to permit the user to modify the augmented content or launch a linked program, and the at least one processor is further configured to:
receive a request of one of the users to search for an on-demand program corresponding to the content of the augmented content, in response to the user launching the linked program;
extract one or more attributes from a corresponding profile of the one of the users to refine a search for the on-demand program; and
cause the presentation module to present the widget with the augmented content embedded with the on-demand program, wherein the on-demand program includes a program with historical content corresponding to the content of the augmented content.

30. A non-transitory computer-readable storage medium carrying one or more instructions which, when executed by one or more processors, cause a set-top box to at least perform the following steps:
correlating content based on a policy defined by the user for displaying and augmenting the content via a widget, wherein the content is received over a data network and the policy includes one or more presentation color scheme settings;
extracting an occurrence of an object appearing in the correlated content;
constructing a metadata description of the occurrence;
transmitting the metadata description from the set-top box;
receiving augmented content for a widget in response to the transmission of the metadata description, wherein the augmented content is generated in real time and on demand in response to a request by a user of the set-top box;
presenting the widget with the augmented content overlaid on a video broadcast at one or more portions of a screen based upon the one or more presentation color scheme settings; and
in response to one voice command of the user for more of the augmented content, augmenting relevant content supplemental to the augmented content into a presentation of the widget with the augmented content, and expanding the presentation over the whole screen,
wherein the widget includes a selectable area to permit the user to modify the augmented content or launch a linked program, and the apparatus is caused to further perform:
receiving a request of one of the users to search for an on-demand program corresponding to the content of the augmented content, in response to the user launching the linked program;
extracting one or more attributes from a corresponding profile of the one of the users to refine a search for the on-demand program; and
presenting, via the set-to box, the widget with the augmented content embedded with the on-demand program, wherein the on-demand program includes a program with historical content corresponding to the content of the augmented content.

* * * * *